(12) United States Patent
Park (10) Patent No.: US 6,286,091 B1
(45) Date of Patent: Sep. 4, 2001

(54) MICROPROCESSOR USING TLB WITH TAG INDEXES TO ACCESS TAG RAMS

(75) Inventor: Sung Soo Park, Seoul (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/280,066

(22) Filed: Mar. 29, 1999

(30) Foreign Application Priority Data

Aug. 18, 1998 (KR) .................................................. 98-33513

(51) Int. Cl.⁷ .................................................. G06F 12/00
(52) U.S. Cl. ........................... 711/207; 711/200; 711/202
(58) Field of Search ................................... 711/207, 118, 711/200, 202

(56) References Cited

U.S. PATENT DOCUMENTS

| | | | |
|---|---|---|---|
| 5,412,787 | 5/1995 | Forsyth et al. | 395/400 |
| 5,542,062 | 7/1996 | Taylor et al. | 395/403 |
| 5,630,088 | * 5/1997 | Gupta | 395/417 |
| 5,646,878 | * 7/1997 | Samra | 365/49 |
| 5,893,146 | * 4/1999 | Pickett | 711/128 |
| 6,014,732 | * 1/2000 | Naffziger | 711/203 |

* cited by examiner

Primary Examiner—Do Hyun Yoo
Assistant Examiner—Kimberly McLean
(74) Attorney, Agent, or Firm—Fleshner & Kim, LLP (57) ABSTRACT

A microprocessor is disclosed, which determines hit/miss by comparing four tag RAMs 5×4 times to improve economical efficiency of a device. The microprocessor includes a first latch for reserving a virtual address whose low bits are identical with a physical address and high bits are different from the physical address; a TLB including TLB indexes having bits smaller than the high bits, for determining hit/miss of the virtual address by receiving the high bits of the virtual address from the first latch; a TLB miss handler for mutually inputting/outputting data with the TLB to produce and store new data in the TLB; a multiplexer for receiving the output of the TLB or the TLB miss handler; a plurality of tag RAMs including CAM cells which stores tag RAM indexes to be compared with the TLB indexes, for selecting the tag RAM indexes corresponding to the low 12 bits of the virtual address; a first comparator for comparing the selected tag RAM indexes with the TLB indexes; a cache miss handler for storing new data in the tag RAMs by receiving the outputs of the multiplexer and the first comparator; data RAMs having the same number of the tag RAMs, for outputting data corresponding to the tag RAM indexes which are identical with the TLB indexes; and a data latch for storing the outputs of the data RAMs and outputting them outside.

13 Claims, 6 Drawing Sheets

MICROPROCESSOR USING TLB WITH TAG INDEXES TO ACCESS TAG RAMS

BACKGROUND OF THE INVENTION

1. Field of the Invention

The present invention relates to a microprocessor, and more particularly, to a microprocessor which improves economical efficiency of a device.

2. Discussion of the Related Art

Generally, a microprocessor receives a virtual address which is used in a memory management unit (MMU) having a pace size of 4 KB and in which low 12 bits are identical with a physical address and high 20 bits are different from the physical address, and inspects cache tags per cycle to determined hit/miss of a cache, so that it takes much power consumption and much time. Actually, a static random access memory (SRAM) occupies about 60% of total power consumption.

Figure 1:
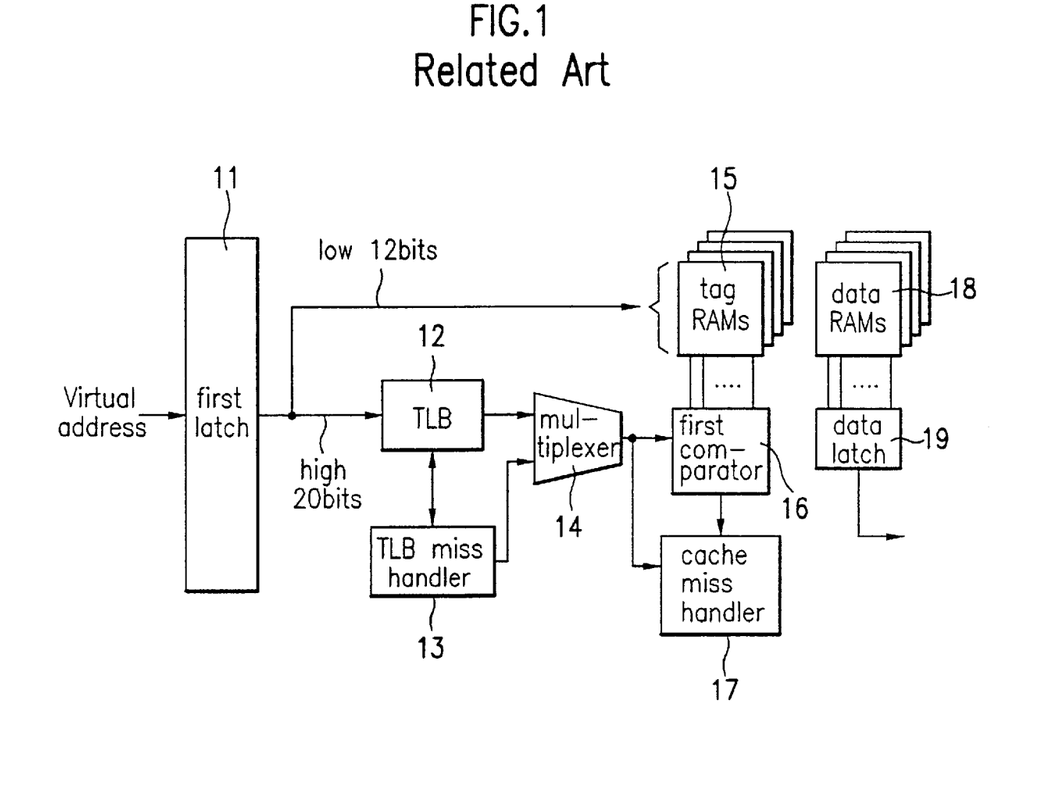
FIG. 1 is a block diagram illustrating a background art MMU and cache.

A background art MMU and cache will be described with reference to FIG. 1.

The MMU includes a virtual address of 32 bits in which low 12 bits are identical with a physical address and high 20 bits are different from the physical address, a first latch 11 which reserves the virtual address, a translation look-aside buffer (TLB) 12 for receiving high 20 bits of the virtual address from the first latch 11, a TLB miss handler 13 for mutually inputting/outputting data with the TLB 12, and a multiplexer 14 for receiving the output of the TLB 12 or the TLB miss handler 13.

The cache includes four tag RAMs 15 for receiving low 12 bits of the virtual address, a first comparator 16 for comparing 20 bits of the tag RAMs selected by low 12 bits of the virtual address with 20 bits of the multiplexer 14, a cache miss handler 17 for receiving the outputs of the multiplexer 14 and the first comparator 16, four data RAMs 18 for receiving the output of the tag RAMs 15, and a data latch 19 for storing and outputting data corresponding to the output of the tag RAMs 15, which is identical with 20 bits of the multiplexer 14.

Figure 2:
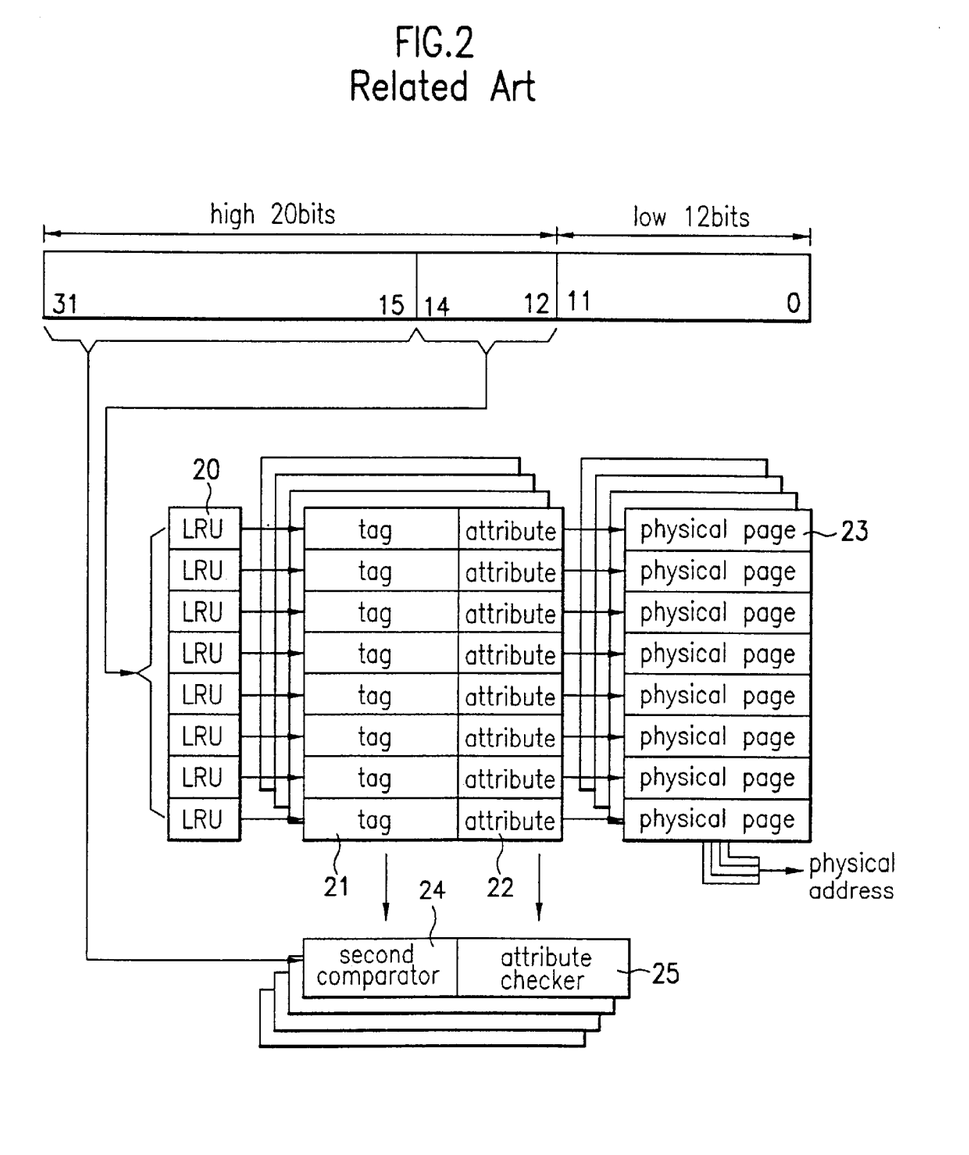
FIG. 2 is a block diagram illustrating a background art TLB.

As shown in FIG. 2, the TLB 12 includes eight least recently useds (LRU) 20 of 3 bits, tags 21 of 20 bits having the same number as the LRUs 20, attributes 22 having the same number as the tags 21, for indicating attribute of each of the tags 21, i.e., whether each of the tags 21 is valid, modified, or up-graded, physical pages 23 of 20 bits having the same number as the tags 21, a second comparator 24 for comparing 20 bits of the tags 21 with high 20 bits of the virtual address, and an attribute checker 25.

The data of the virtual address are selected or erased based on the LRUs 20 when inputting data of a new virtual address to the tags 21 at the state that data of the virtual address are input to all the tags 21.

The operation of the background art MMU and cache will be described below.

The virtual address of 32 bits in which low 12 bits are identical with the physical address and high 20 bits are different from the physical address is input to the first latch 11. Then, the low 12 bits of the virtual address are output to the tag RAMs 15 and its high 20 bits are output to the TLB 12. At this time, the tag RAMs 15 select four data whose low 12 bits are identical with the low 12 bits of the virtual address.

Subsequently, the TLB 12 compares 20 bits of each of the tags 21 with the high 20 bits of the virtual address. As a results, the TLB 12 determines a hit if there are the same tags 21 as the high 20 bit of the virtual address. If not, the TLB 12 determines a miss.

First, if a hit is determined by the TLB 12, that is, if there are the same tags 21 as the high 20 bits of the virtual address, 20 bits data of the physical pages 23 corresponding to the tags 21 are output to the multiplexer 14.

At this time, the multiplexer 14 outputs the output of the TLB 12, i.e., the 20 bit data of the physical pages 23 to the first comparator 16. The first comparator 16 compares the 20 bit data of the physical pages 23 with each data selected by the four tag RAMs 15. As a result, if there are the same data as those of the physical pages 23 in tag RAMs 15, the data RAMs 18 receive the output of the tag RAMs 15 to detect one data which is identical with the data of the tag RAMs and outputs the detected data outside through the data latch 19. On the other hand, if there are no data the same as those of the physical pages 23 in the tag RAMs 15, the first comparator 16 outputs a miss to the cache miss handler 17.

The cache miss handler 17 outputs data corresponding to the physical pages 23, i.e., the output of the TLB 12 missed by the tag RAMs 15 outside from a memory (not shown) of the microprocessor and at the same time stores the same in the tag RAMs 15 and the data RAMs 18.

Further, if a miss is determined by the TLB 12, that is, if there are no tags 21 the same as the high 20 bits of the virtual address, the TLB 12 outputs a miss to the TLB miss handler 13.

The TLB miss handler 13 produces the tags 21 and the physical pages 23 corresponding to the high 20 bits of the virtual address missed by the TLB 12, outputs the 20 bits data of the physical pages 23 corresponding to the tag 21 of the new data to the multiplexer 14 and at the same time stores the produced tag 21 and the physical pages 23 in the TLB 12. Thereafter, the same operation as a hit is performed.

Therefore, the first comparator 16 uses all 20 bits data of the physical pages 23 to inspect the tag RAMs 15. This results in that the four tag RAMs 15 are compared 20 bits×4 [four tag RAMs], i.e. 80 times.

The background art microprocessor has several problems. Since the tag RAMs are compared using all 20 bits of the physical pages, total 80 times are compared to determine hit/miss. This requires a circuit having fast comparing speed and increases power consumption, thereby reducing economical efficiency.

SUMMARY OF THE INVENTION

Accordingly, the present invention is directed to a microprocessor that substantially obviates one or more of the problems due to limitations and disadvantages of the related art.

An object of the present invention is to provide a microprocessor which determines hit/miss by comparing (e.g., four) tag RAMs indexes (e.g., 5×4 times) to improve economical efficiency of a device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a microprocessor according to the present invention includes a first latch for reserving a virtual address whose low bits are identical with a physical address and high bits are different from the physical address; a TLB including TLB indexes having bits smaller than the high bits, for determining hit/miss of the virtual address by receiving the high bits of the virtual address from the first latch; a TLB miss handler for mutually inputting/outputting data with the TLB to produce and store new data in the TLB; a multiplexer for receiving the output of the TLB or the TLB miss handler; a plurality of tag RAMs including CAM cells which stores tag RAM indexes to be compared with the TLB indexes, for selecting the tag RAM indexes corresponding to the low 12 bits of the virtual address; a first comparator for comparing the selected tag RAM indexes with the TLB indexes; a cache miss handler for storing new data in the tag RAMs by receiving the outputs of the multiplexer and the first comparator; data RAMs having the same number of the tag RAMs, for outputting data corresponding to the tag RAM indexes which are identical with the TLB indexes; and a data latch for storing the outputs of the data RAMs and outputting them outside.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
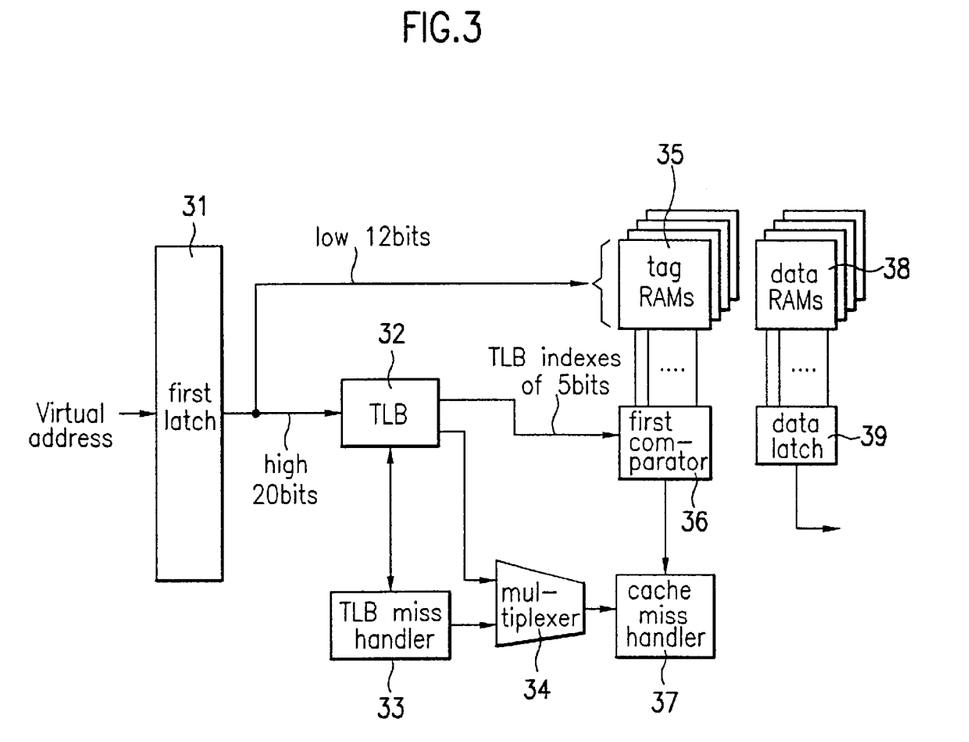
FIG. 3 is a block diagram illustrating an MMU and cache according to the embodiment of the present invention.

As shown in FIG. 3, an MMU of the present invention includes a virtual address whose low 12 bits are identical with a physical address and high 20 bits are different from the physical address, a first latch 31 for reserving the virtual address, a TLB 32 including TLB indexes 46, for receiving the high 20 bits of the virtual address from the first latch 31, a TLB miss handler 33 for mutually inputting/outputting data with the TLB 32, and a multiplexer 34 for receiving the outputs of the TLB 32 or the TLB miss handler 33.

A cache of the present invention includes four tag RAMs 35 including content addressable memory (CAM) cells 52, for receiving the low 12 bits of the virtual address, a first comparator 36 for comparing 5 bits of the TLB indexes 46 with 5 bits of the tag RAM indexes stored in the CAM cells 52 of the tag RAM 35 selected by the low 12 bits of the virtual address, a cache miss handler 37 for receiving the outputs of the multiplexer 34 and the first comparator 36, four data RAMs 38 for receiving the outputs of the tag RAMs 35, and a data latch 39 for storing and outputting outside the outputs of the data RAMs 38.

Figure 4:
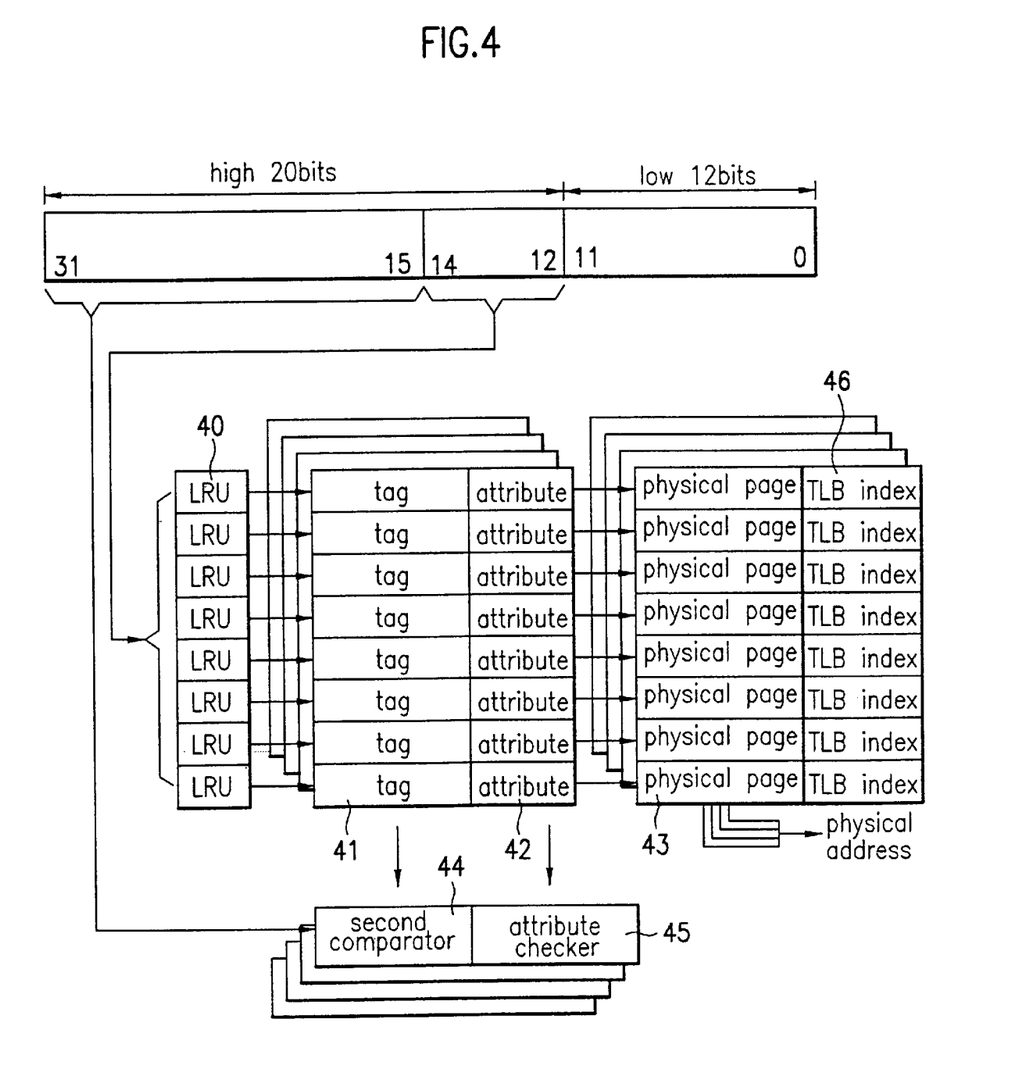
FIG. 4 is a block diagram illustrating a TLB according to the embodiment of the present invention.

As shown in FIG. 4, the TLB 32 includes eight LRUs 40 of 3 bits, tags 41 of 20 bits having the same number as the LRUs 40, attributes 42 having the same number as the tags 41, for indicating attributes of each of the tags 41, i.e., whether each of the tags 41 is valid, modified or up-graded, physical pages 43 of 20 bits having the same number as the tags 41, a second comparator 44 for comparing 20 bits of the tags 41 with the high 20 bits of the virtual address, an attribute checker 45, and TLB indexes 46 of 5 bits formed at one side of each physical page 43.

The data of the existing virtual address are selected or erased based on the LRUs 40 when inputting data of a new virtual address to the tags 41 at the state that data of the virtual address are input to all the tags 41.

Figure 5:
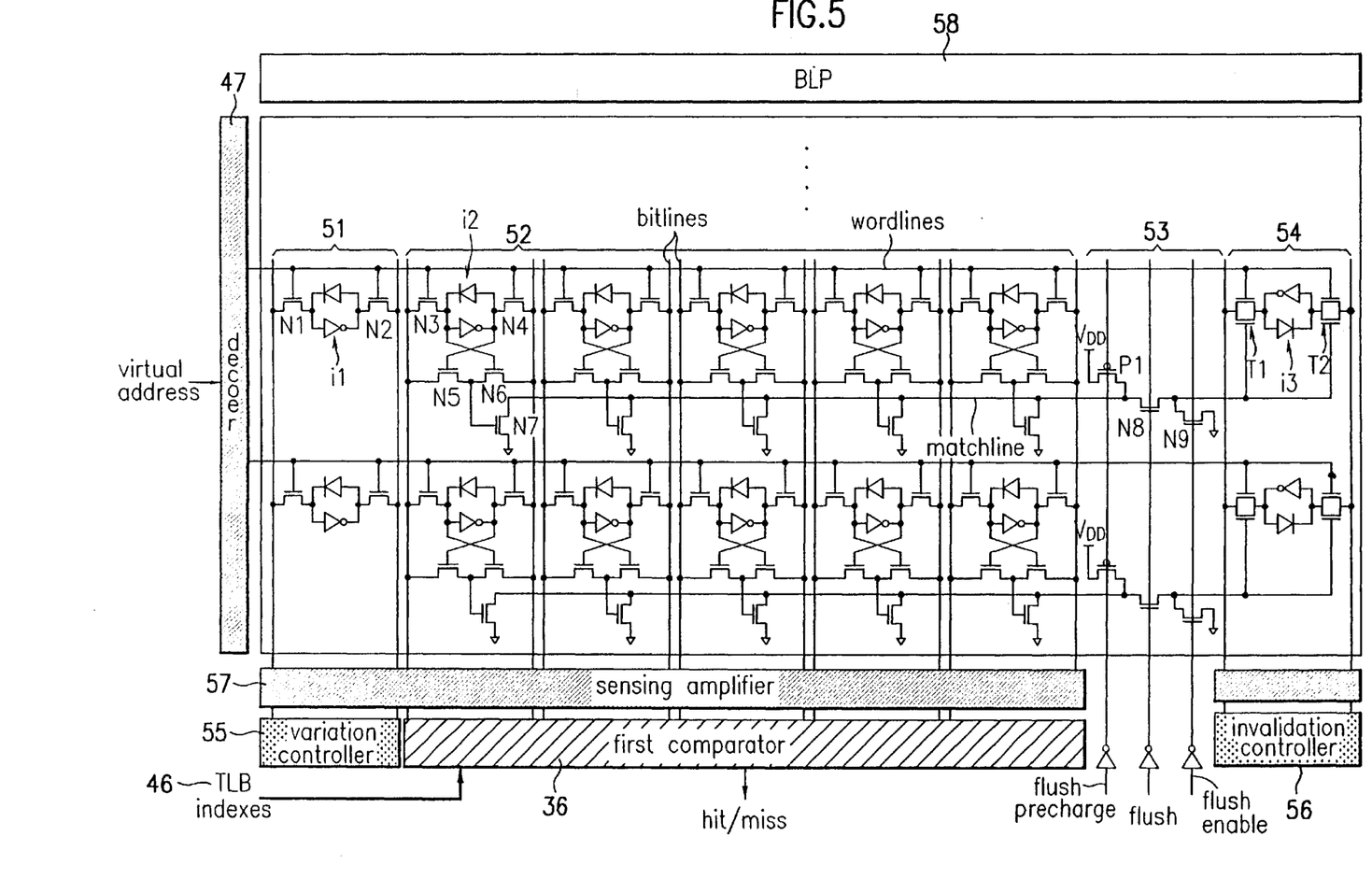
FIG. 5 is a circuit diagram illustrating tag RAMs according to the embodiment of the present invention.

As shown in FIG. 5, each of the tag RAMs 35 includes wordlines, bitlines, a sensing amplifier 57, a bitline precharge 58, a decoder 47 for receiving the virtual address of the low 12 bits, SRAM cells 51 and CAM cells 52 for receiving the outputs of the decoder 47 from the wordlines and outputting the tag RAM indexes to the sensing amplifier 57 through the bitlines, an invalidation selector 53 and invalidation cells 54.

At this time, the tag RAM indexes of 5 bits which will be compared with the TLB indexes 46 by the first comparator 36 are stored in the CAM cells 52.

Further, each of the tag RAMs 35 include the first comparator 36 for comparing the tag RAM indexes of 5 bits with the TLB indexes 46 of 5 bits, a variation controller 55, an invalidation controller 56, and a match line.

Each of the SRAM cells 51 includes first and second NMOS transistors N1 and N2 whose gates are connected to the wordlines, one impurity regions are connected to the bitlines, and the other impurity regions are commonly connected to two first inverters i1 formed in different direction.

Each of the CAM cells 52 includes third and fourth NMOS transistors N3 and N4 whose gates are connected to the wordlines, first impurity regions are connected to the bitlines, and second impurity regions are commonly connected to two second inverters i2 formed in different direction, a fifth NMOS transistor N5 whose gate is connected to the output of the second impurity region of the fourth NMOS transistor N4 and one impurity region is connected to the bitlines, a sixth NMOS transistor N6 whose gate is connected to the output of the second impurity region of the third NMOS transistor N3 and one impurity region is connected to the bitlines, and a seventh NMOS transistor N7 whose gate is commonly connected to the other impurity regions of the fifth and sixth NMOS transistors N5 and N6, one impurity region is connected to $V_{SS}$ and the other impurity region is connected to the match line.

The invalidation selector 53 includes a flush-precharge signal, a flush signal, a flush-enable signal, two first PMOS transistors P1 whose gates are connected to an inverted flush-precharge signal of the flush-precharge signal, one impurity regions are connected to a driving voltage $V_{DD}$, and the other impurity regions are connected to the match line, two eighth NMOS transistors N8 whose gates are connected to an inverted flush signal and one impurity regions are connected to the match line, and two ninth NMOS transistors N9 whose gates are connected to an inverted flush-enable signal, one impurity regions are connected to $V_{SS}$ and the other impurity regions are connected to the impurity regions of the eighth NMOS transistors N8 which are not connected to the match line.

Each of the invalidation cells 54 includes first and second transfer gates T1 and T2 commonly connected to two third inverters i3 formed in different direction therebetween, for receiving the outputs of the wordlines and the common impurity regions of the eighth and ninth NMOS transistors N8 and N9 and outputting invalidation data to the bitlines.

The operation of the MMU and the cache according to the embodiment of the present invention will be described below.

First, the virtual address whose low 12 bits are identical with the physical address and the high 20 bits are different from the physical address is input to the first latch 31. The low 12 bits of the virtual address which is reserved in the first latch 31 are output to the tag RAMs 35 and its high 20 bits are output to the TLB 32.

At this time, the tag RAMs 35 select four data whose low 12 bits are identical with the low 12 bits of the virtual address.

The TLB 32 compares 20 bits of each of the tags 41 with the high 20 bits of the virtual address. As a result, if there are the same tags 41 as the high 20 bits of the virtual address, it is determined as a hit. If not, it is determined as a miss.

If a hit is determined by the TLB 32, that is, there are the same tags 41 as the high 20 bits of the virtual address, the TLB indexes of 5 bits corresponding to the tags 41 are output to the first comparator 36 and 20 bit data of the physical pages 43 corresponding to the tags 41 are output to the multiplexer 34.

The first comparator 36 compares 5 bit data of the TLB indexes 46 with the tag RAM indexes of each of the data selected by the tag RAMs 35. As a result, if there are the same data as the outputs of the TLB 32, i.e., 5 bit data of the TLB indexes 46 in the tag RAMs 35, the data RAMs 38 receives the outputs of the tag RAMs 35 to detect one data which is identical with the data of the tag RAMs and outputs the data outside through the data latch 39. On the other hand, if there are no data the same as the outputs of the TLB 32, i.e., 5 bits data of the TLB indexes 46 in the tag RAMs 35, the first comparator 36 outputs miss data to the cache miss handler 37.

The cache miss handler 37 outputs data corresponding to 5 bits of the TLB indexes 46 missed by the tag RAMs 35 outside from a memory (not shown) of the microprocessor and at the same time stores the same in the tag RAMs 35 and the data RAM 38.

Therefore, the first comparator 36 uses 5 bits data of the TLB indexes 46 to inspect the tag RAMs 35. The tag RAMs 35 are compared 5 bits×4 [four tag RAMs], i.e., 20 times.

Further, if a miss is determined by the TLB 32, the microprocessor stops outputting the physical address, counts the virtual address determined as a miss by the TLB miss handler 33, and outputs the results to the TLB 32 and the multiplexer 34.

Thereafter, the same operation as a hit is performed.

Subsequently, the TLB 32 updates contents of the virtual address determined as a miss.

At this time, data of the cache having the TLB indexes 46 prior to update should be invalidated because the data are different from the physical address.

In other words, if the tags 41 corresponding to "01011" have been updated due to miss, data of the tag RAMs 35 of the cache having "01011" as index data should be invalidated.

A method for invalidating data will be described with reference to FIG. 6.

Figure 6:
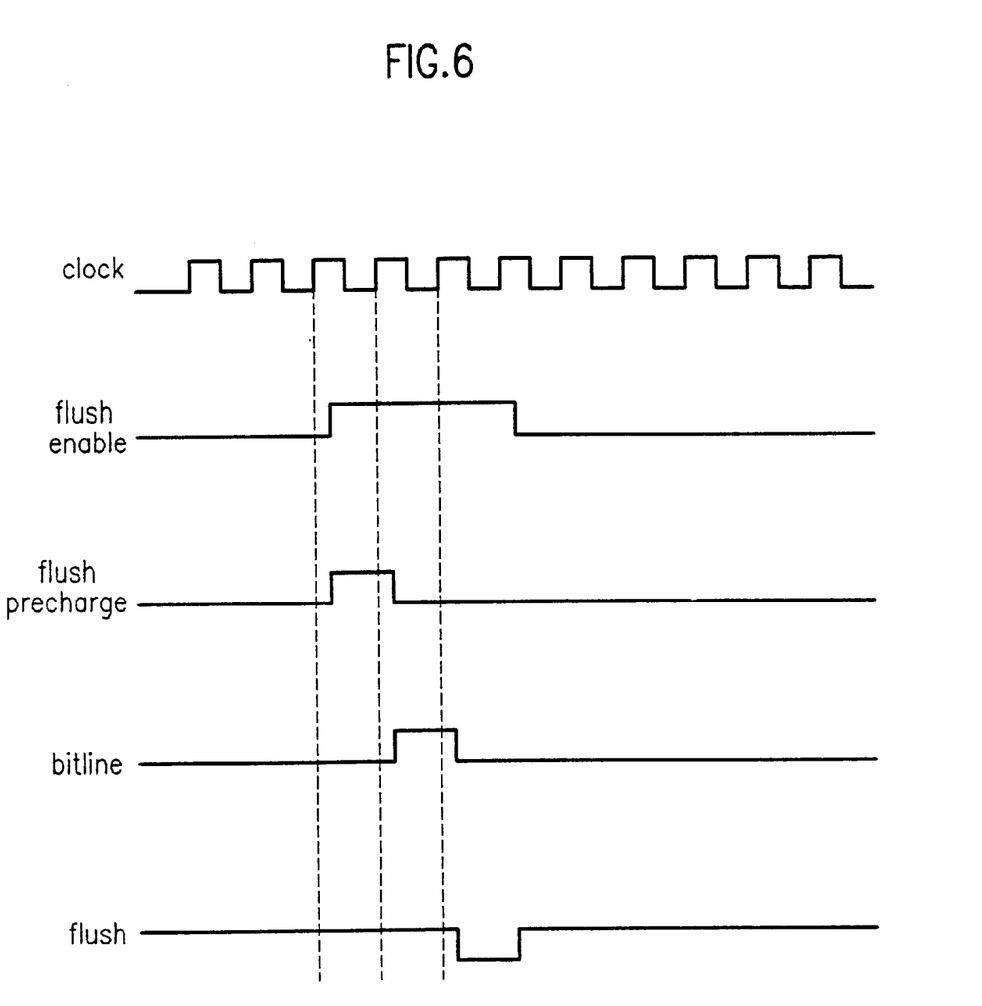
FIG. 6 are pulse waveforms for invalidation of data according to the embodiment of the present invention.

As shown in FIG. 6, since the flush-enable signal is low when a miss is not determined by the TLB 32, the first PMOS transistors P1 and the eighth NMOS transistors N8 are turned off and the ninth NMOS transistors N9 are turned on.

If the flush-enable signal becomes high as a miss is determined by the TLB 32, the first PMOS transistors P1 are turned on, so that the invalidation selector 53 is precharged to $V_{DD}$.

At this time, the bitlines of the invalidation cells 54 are set to '1'.

If "01011" is input to the bitlines at the state that the invalidation selector 53 is precharged to $V_{DD}$, the tag match line of the SRAM cells 51 is maintained at high and the miss match line is maintained at low. At this time, if the flush signal becomes high to turn on the eighth NMOS transistors N8, the first and second transfer gates T1 and T2 of the invalidation cells 54 are turned on.

As aforementioned, the microprocessor of the present invention has the following advantages.

Since the TLB of the MMU includes the TLB indexes of 5 bits and the tag RAMs of the cache includes tag RAM indexes of 5 bits data to be compared with the TLB indexes, that is, four tag RAMs are compared using the TLB indexes of 5 bits, hit/miss is determined by comparing the indexes 5 bits×4 times, so that comparing speed is improved by about 75%. This does not require a separate circuit having fast comparing speed and reduces power consumption by 75% as compared to the background art microprocessor, thereby improving economical efficiency of the device. In addition, since the cache tag RAMs can select flush, intelligent cache design which selectively invalidates data without using the TLB can be achieved.

It will be apparent to those skilled in the art that various modifications and variations can be made in the microprocessor according to the present invention without departing from the spirit or scope of the invention. Thus, it is intended that the present invention covers the modifications and variations of the invention provided they come within the scope of the appended claims and their equivalents.

What is claimed is:

1. A microprocessor comprising:
   a first latch for reserving a virtual address whose low bits are identical with a physical address and high bits are different from the physical address;
   a TLB including TLB indexes having bits smaller than the high bits, for determining hit/miss of the virtual address by receiving the high bits of the virtual address from the first latch;
   a TLB miss handler for mutually inputting/outputting data with the TLB to produce and store new data in the TLB;
   a multiplexer for receiving an output of the TLB or the TLB miss handler;
   a plurality of tag RAMs including CAM cells which stores tag RAM indexes to be compared with the TLB indexes, for selecting the tag RAM indexes corresponding to the low bits of the virtual address;
   a first comparator for comparing the selected tag RAM indexes with the TLB indexes;
   a cache miss handler for storing new data in the tag RAMs by receiving the outputs of the multiplexer and the first comparator;
   data RAMs, which are equal in number to the tag RAMs, for outputting data corresponding to the tag RAM indexes which are identical with the TLB indexes; and a data latch for storing the outputs of the data RAMs and outputting them outside, wherein the tag RAMs includes wordlines, bitlines, a sensing amplifier, a bitline precharge, a decoder for receiving the virtual address of the low bits, SRAM cells and CAM cells for receiving the outputs of the decoder from the wordlines and outputting the tag RAM indexes to the sensing amplifier through the bitlines, an invalidation selector, invalidation cells, the first comparator for comparing the tag RAM indexes with the TLB indexes of bits, a variation controller, an invalidation controller, and a match line.

2. The microprocessor as claimed in claim 1, wherein the TLB includes eight LRUs of 3 bits, tags of 20 bits equal in number to the LRUs, attributes equal in number to the tags, for indicating attributes of each of the tags, physical pages of 20 bits equal in number to the tags, a second comparator for comparing 20 bits of the tags with the high bits of the virtual address, an attribute checker, and TLB indexes of 5 bits formed at one side of each physical page.

3. The microprocessor as claimed in claim 1, wherein each of the SRAM cells includes first and second NMOS transistors whose gates are connected to the wordlines, one impurity region is connected to the bitlines, and the other impurity region is commonly connected to two first inverters formed in different direction.

4. The microprocessor as claimed in claim 1, wherein each of the CAM cells includes third and fourth NMOS transistors whose gates are connected to the wordlines, first impurity regions are connected to the bitlines, and second impurity regions are commonly connected to two second inverters formed in different direction, a fifth NMOS transistor whose gate is connected to an output of the second impurity region of the fourth NMOS transistor and one impurity region is connected to the bitlines, a sixth NMOS transistor whose gate is connected to an output of the second impurity region of the third NMOS transistor and one impurity region is connected to the bitlines, and a seventh NMOS transistor whose gate is commonly connected to an other impurity region of the fifth and sixth NMOS transistors, one impurity region is connected to $V_{SS}$ and the other impurity region is connected to the match line.

5. The microprocessor as claimed in claim 1, wherein the invalidation selector includes a flush-precharge signal, a flush signal, a flush-enable signal, two first PMOS transistors whose gates are connected to an inverted flush-precharge signal of the flush-precharge signal, one impurity region is connected to a driving voltage $V_{DD}$, and an other impurity region is connected to the match line, two eighth NMOS transistors whose gates are connected to an inverted flush signal and one impurity region is connected to the match line, and two ninth NMOS transistors whose gates are connected to an inverted flush-enable signal, one impurity region is connected to $V_{SS}$ and an other impurity region is connected to an impurity region of the eighth NMOS transistors which are not connected to the match line.

6. The microprocessor as claimed in claim 1, wherein each of the invalidation cells includes first and second transfer gates commonly connected to two third inverters formed in different direction therebetween, for receiving outputs of the wordlines and common impurity regions of eighth and ninth NMOS transistors and outputting invalidation data to the bitlines.

7. A microprocessor comprising:
a first latch that reserves a virtual address whose first bits are identical with a physical address and second bits are different from the physical address;

a TLB including TLB indexes having bits smaller than the second bits that determines hit/miss of the virtual address using the second bits of the virtual address from the first latch;

a multiplexer for receiving an output of the TLB;

a plurality of tag RAMs including CAM cells which stores tag RAM indexes to be compared with the TLB indexes, that select the tag RAM indexes corresponding to the first bits of the virtual address;

a first comparator that compares the selected tag RAM indexes with the TLB indexes;

a cache miss handler that stores new data in the tag RAMs, wherein the cache miss handler receives outputs of the multiplexer and the first comparator;

data RAMs, which are equal in number to the tag RAMs that output data corresponding to the tag RAM indexes which are identical with the TLB indexes; and a data latch that stores the outputs of the data RAMs for outputting them outside, wherein the tag RAMs includes wordlines, bitlines, a decoder for receiving the virtual address of the first bits, SRAM cells and CAM cells for receiving outputs of the decoder from the wordlines and outputting the tag RAM indexes to the first comparator, which compares the tag RAM indexes with the TLB indexes, and a match line, wherein each of the SRAM cells includes first and second transistors whose gates are connected to the wordlines, first impurity regions are connected to the bitlines, and second impurity regions are commonly connected to two first inverters formed in different direction.

8. The microprocessor as claimed in claim 7, wherein the TLB includes eight LRUs of 3 bits, tags of 20 bits equal in number as the LRUs, attributes equal in number as the tags, for indicating attributes of each of the tags, physical pages of 20 bits equal in number to the tags, a second comparator for comparing 20 bits of the tags with the second bits of the virtual address, an attribute checker, and the TLB indexes.

9. The microprocessor as claimed in claim 7, wherein each of the CAM cells includes third and fourth transistors whose gates are connected to the wordlines, first impurity regions are connected to the bitlines, and second impurity regions are commonly connected to two second inverters formed in different direction, a fifth transistor whose gate is connected to an output of the second impurity region of the fourth transistor and first impurity region is connected to the bitlines, a sixth transistor whose gate is connected to an output of the second impurity region of the third transistor and first impurity region is connected to the bitlines, and a seventh transistor whose gate is commonly connected to second impurity regions of the fifth and sixth transistors, whose first impurity region is connected to a ground voltage and whose second impurity region is connected to the match line.

10. A microprocessor comprising:
first latch means for receiving a virtual address whose first bits are identical with a physical address and second bits are different from the physical address;

TLB means including TLB indexes having bits smaller in number than the second bits for determining hit/miss of the virtual address using the second bits of the virtual address from the first latch means;

multiplexer means for receiving an output of the TLB means;

a plurality of tag RAMs including CAM cells that stores tag RAM indexes to be compared with the TLB indexes, that select the tag RAM indexes corresponding to the first bits of the virtual address;

first comparator means for comparing the selected tag RAM indexes with the TLB indexes;

cache miss handler means for storing new data in the tag RAMs, wherein the cache miss handler means receives outputs of the multiplexer means and the first comparator means;

data RAMs equal in number to the tag RAMs that output data corresponding to the tag RAM indexes which are identical with the TLB indexes; and data latch means for storing the outputs of the data RAMs for outputting them outside, wherein the tag RAMs includes wordlines, bitlines, decoder means for receiving the virtual address of the first bits, memory cells for receiving outputs of the decoder means from the wordlines and outputting the tag RAM indexes to the first comparator means for comparing the tag RAM indexes with the TLB indexes, invalidation selector means, invalidation cells, invalidation controller means, and match line means.

11. The microprocessor as claimed in claim 10, wherein the TLB means includes eight LRUs of 3 bits, tags of 20 bits equal in number to the LRUs, attributes equal in number to the tags, for indicating attributes of each of the tags, physical pages of 20 bits equal in number to the tags, second comparator means for comparing 20 bits of the tags with the second bits of the virtual address, attribute checker means, and TLB indexes of 5 bits formed at one side of each physical page.

12. The microprocessor as claimed in claim 10, wherein the invalidation selector means includes a flush-precharge signal, a flush signal, a flush-enable signal, two first conductivity type transistors whose gates are connected to an inverted flush-precharge signal of the flush-precharge signal, first impurity regions are connected to a driving voltage, and second impurity regions are connected to the match line means, first and second transistors of a second conductivity type whose gates are connected to an inverted flush signal and first impurity regions are connected to the match line means, and third and fourth transistors of the second conductivity type whose gates are connected to an inverted flush-enable signal, first impurity regions are connected to a reference voltage and second impurity regions are respectively connected to the second impurity regions of the first and second transistors of the second conductivity type which are not connected to the match line means.

13. The microprocessor as claimed in claim 12, wherein each of the invalidation cells includes first and second transfer gates commonly connected to two inverter means formed in different direction therebetween, for receiving outputs of the wordlines and the common impurity regions of the first through fourth transistors of the second conductivity type and outputting invalidation data to the bitlines.

* * * * *